Patented May 30, 1933

1,911,882

UNITED STATES PATENT OFFICE

PHILLIP E. CRANE, OF MIDDLEBURY, VERMONT, ASSIGNOR TO CRANE HONEY INCORPORATED, OF WASHINGTON, DISTRICT OF COLUMBIA, A CORPORATION OF DELAWARE

FOOD PRODUCT

No Drawing. Application filed April 30, 1930. Serial No. 448,790.

An object of my invention is to provide a food product which will utilize honey that is so desirable for food which will increase the availability of honey and its attractiveness to consumers, and in particular to provide such product available for use in the form of a spread.

My invention consists in whatever is described by or is included within the terms or scope of the appended claims.

In what at the present time I consider the most desirable and advantageous embodiment of my invention, I combine apricot and in a dried or dehydrated form with honey in granulated form. A very good proportion is ten parts of dried apricots to ninety parts of honey, but, of course, I do not confine myself to that proportion. That proportion enables a large quantity of honey to be used and yet the comparatively small proportion of apricot gives the modifying effect on the honey which is important as affecting its sweetness and taste and giving the product the mechanical and other properties which the product by extensive use on the market is shown to possess. The product by reason of the presence of the apricot does not have the stickiness and fluidity of honey, and, therefore, the product is convenient to handle, especially when used as a spread because it does not tend to run and yet it may be readily spread or applied to the surface of a slice of bread for example. The dried apricot has sufficient toughness to overcome or diminish the natural fluidity of honey when the two are thoroughly mixed and in effect become a homogeneous product. Though having the desired degree of toughness, it nevertheless is sufficiently stretchable under spreading pressure to render it available as a spread.

In order to bring about the desired intimate mixture of the honey and dried apricot, I subject them to a milling or grinding process as by the action of disks or rolls.

Other dried or dehydrated fruits, berries, vegetables and nuts may be used in place of apricot or combined with the apricot and the honey.

A very important consideration in the production of a food product embodying my invention is that no heating or cooking is required to render the product entirely available as a spread. Apricots notably, and other fruits and vegetables contain potent materials that are valuable in the human system which are injured or destroyed when they are heated or cooked for food.

What I claim is:—

1. The method of forming a food spread which comprises intimately admixing substantial proportions of dried fruit and granulated honey to produce a homogeneous body which is characterized by its adaptability for being readily spread and the fact that it will not ferment under the atmospheric and temperature conditions to which food spreads are normally subjected in marketing.

2. The method of forming a food spread which comprises intimately admixing substantial proportions of dried apricot and granulated honey prior to any substantial heating thereof so that the enzymes and food values present in natural unheated honey will be present therein, the admixture being effected to such extent as to form a homogeneous body which is characterized by its adaptability for being readily spread and its freedom of objectionable stickiness.

3. The method of forming a food spread which comprises intimately admixing substantial proportions of dried apricot and granulated honey by milling or grinding the same to produce a homogeneous body which is characterized by its adaptability for being readily spread and the fact that it will not ferment under the atmospheric and temperature conditions to which food spreads are normally subjected in marketing.

4. A food product comprising granulated honey and dried fruit in substantial proportions as a homogeneous mixture of the consistency of a spread which is characterized by being capable of being readily spread and the fact that it will not ferment under the atmospheric and temperature conditions to which food spreads are normally subjected in marketing.

5. A food product comprising granulated honey and dried apricot in substantial proportions as a homogeneous mixture of the consistency of a spread which is characterized by being capable of being readily spread and the fact that it will not ferment under the atmospheric and temperature conditions to which food spreads are normally subjected in marketing.

6. A food product comprising an intimate admixture of approximately 10% of dried fruit with 90% of granulated honey, which honey contains the enzymes and food values present in natural unheated honey, and the intimate admixture being such that it is in the form of a substantially homogeneous body having the consistency of a spread which is characterized by being capable of being readily spread and the fact that it will not ferment under the atmospheric and temperature conditions to which food spreads are normally subjected in marketing.

7. The method of forming a food spread which comprises intimately admixing dried fruit and granulated honey by milling or grinding the same at substantially atmospheric temperature to produce a homogeneous body, the honey being in excess of the dried fruit and the admixing being effected prior to any substantial heating of the honey so that the enzymes and food values present in natural unheated honey will be present in the product, the admixing being effected to such extent as to form a homogeneous body which is characterized by its adaptability for being readily spread and the fact that it will not ferment under the atmospheric and temperature conditions to which food spreads are normally subjected in marketing.

In testimony whereof I hereunto affix my signature.

PHILLIP E. CRANE.